United States Patent [19]

Laughlin et al.

[11] Patent Number: 5,386,959
[45] Date of Patent: Feb. 7, 1995

[54] BOX SUPPORT

[75] Inventors: Raymond S. Laughlin, Cuyahoga Falls; Martin F. Delmore, Seven Hills, both of Ohio

[73] Assignee: Erico International Corporation, Solon, Ohio

[21] Appl. No.: 820,762

[22] Filed: Jan. 15, 1992

Related U.S. Application Data

[63] Continuation of Ser. No. 283,577, Dec. 14, 1988, abandoned.

[51] Int. Cl.⁶ .................................................. E04G 3/00
[52] U.S. Cl. ................................. 248/205.1; 248/906; 248/909; 248/200.1
[58] Field of Search ............... 248/205.1, 906, 909, 248/200.1, 544, 298, 27.1; 220/3.3, 3.9; 174/63

[56] References Cited

U.S. PATENT DOCUMENTS

| | | | |
|---|---|---|---|
| 1,464,620 | 8/1923 | Tefft | 248/DIG. 6 X |
| 1,515,216 | 11/1924 | Kissinger | 248/906 X |
| 1,800,813 | 4/1931 | Banfield | 174/63 |
| 1,961,728 | 6/1934 | Arnest et al. | 248/DIG. 6 X |
| 3,536,287 | 10/1970 | Kramer | 248/DIG. 9 X |
| 4,180,226 | 12/1979 | Matte | 248/343 X |
| 4,399,922 | 8/1983 | Horsley | 248/906 X |
| 4,447,030 | 5/1984 | Nattel | 248/DIG. 6 X |
| 4,757,967 | 7/1988 | Delmore et al. | 248/DIG. 6 X |

*Primary Examiner*—Karen J. Chotkowski
*Attorney, Agent, or Firm*—Renner, Otto, Boisselle & Sklar

[57] ABSTRACT

An electrical box support assembly for stud wall construction includes two channel shape struts with one being confined by and telescoping in the other. Both have a longitudinally extending V-shape groove opening toward the box or boxes to be supported thereon whereby the boxes may quickly be attached by a self tapping screw with a screw gun. The groove ensures that each box is straight and, if more than one box is mounted, both straight and aligned. While the two parts may be telescoped they are not readily separable and are sufficiently rigid so that they do not need to be preassembled. The opposite ends of the struts are each provided with planar tabs with two longitudinally spaced designed bend points at which the strut ends or tabs may selectively be field bent to form right angle flanges matching the depth of the box to be supported. The tab ends of the struts are shipped straight or flat and in some forms may include one or more additional bend points which, when the strut end tab is selectively bent, may be used to form a flange substantially parallel to the strut. The parallel flange may be the full width or one-half the width of the stud. The field formed flanges may be provided with holes to facilitate the screw gun fastening of the strut ends to substantially any surface of the stud. If a projecting portion of the tab is not employed, it may simply be folded back on itself to form a double thickness end.

26 Claims, 3 Drawing Sheets

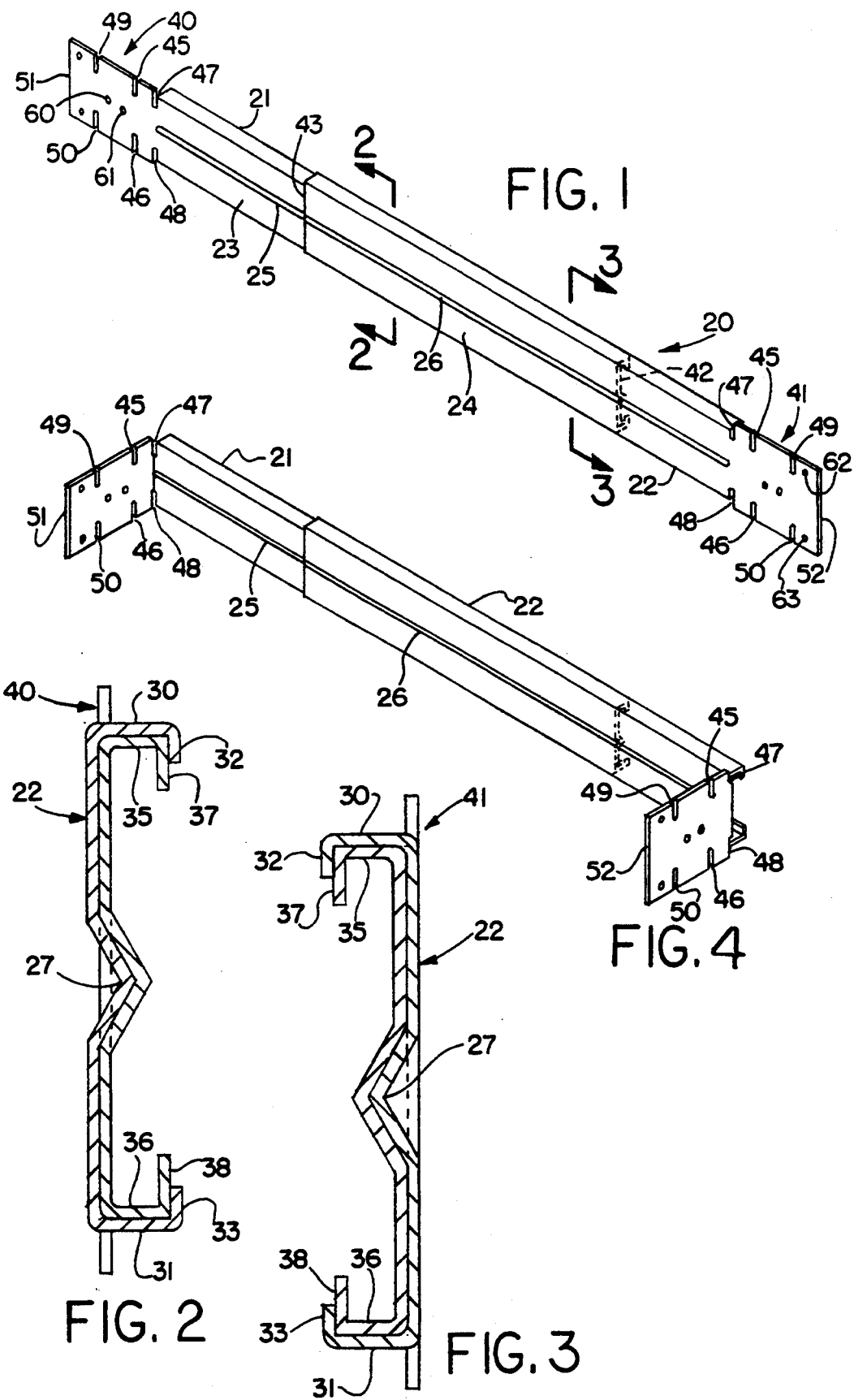

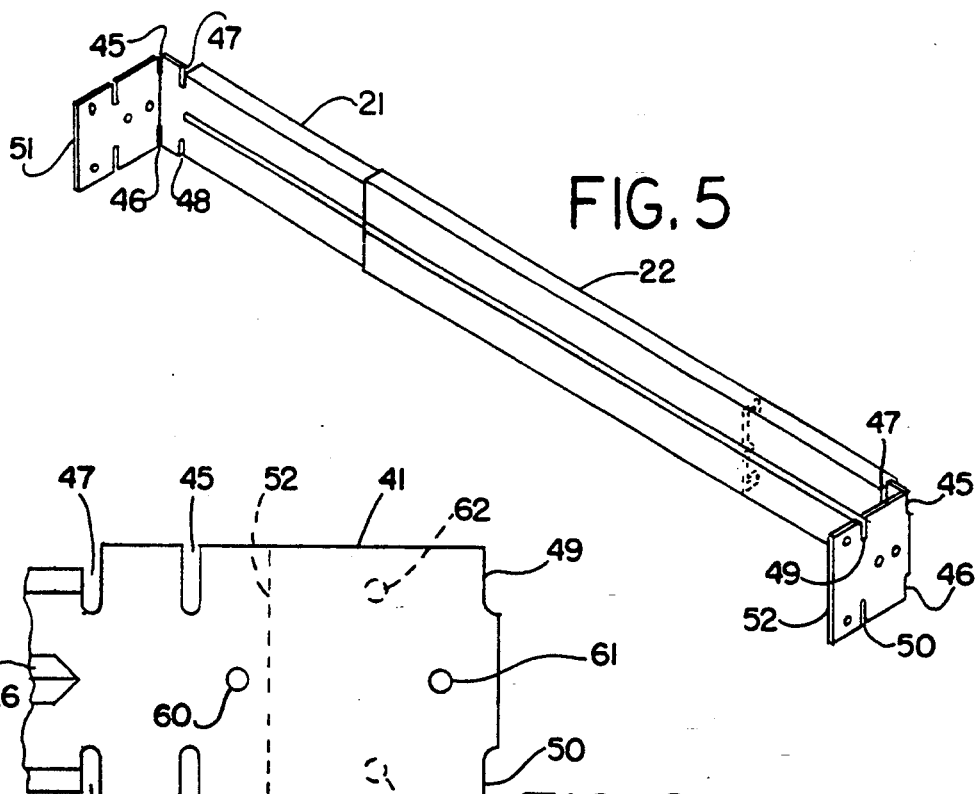
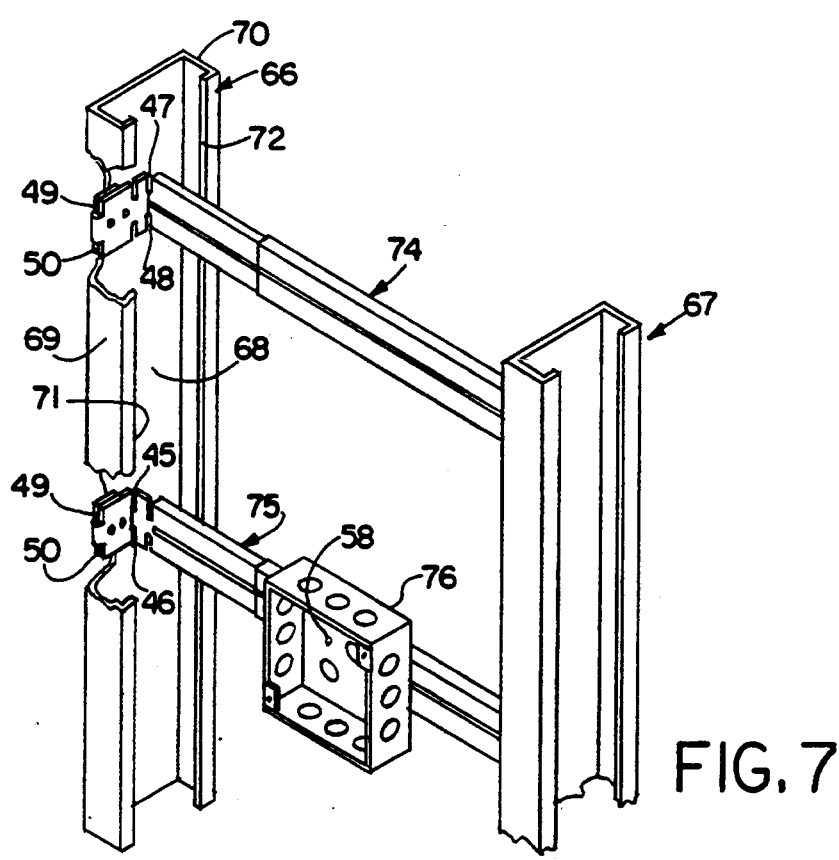

BOX SUPPORT

This is a continuation of copending application Ser. No. 07/283,577, filed on Dec. 14, 1988, now abandoned.

DISCLOSURE

This invention relates generally as indicated to a box support and more particularly to an adjustable box support which may be field formed to accommodate boxes of different depth.

BACKGROUND OF THE INVENTION

The present invention relates to certain improvements in a box support as shown in prior U.S. Pat. No. 4,757,967. In such prior patent there is illustrated a two part telescoping strut for supporting an electrical box or like device in a studded wall. The strut includes an outwardly opening V-shape horizontal groove which facilitates the horizontal positioning and alignment of such boxes. The driving of a fastener from the box through the crotch of the V-shape groove not only aligns the box but also secures the two horizontally adjustable parts of the strut together.

Unfortunately electrical boxes come in two separate depths which requires different spacing or set back of the strut from the edges of the studs for each box depth size. Therefore, a customer or installer would require different types of struts for different box depths even though the only difference in the struts would be a difference in the rebent ends or flanges by means of which the strut parts are secured to the studs. Also, because of the factory prebent nature of the parts enabling the parts to be nested for compact shipping, the struts could not readily be secured to the interior of a typical channel shape metal stud. Prebent flanges for one type of stud mounting make it difficult if not impossible to mount the strut in any other fashion. This problem has created shipping and inventory problems for customers which required field selection of the right strut for the right box, and for the right stud mounting application. This problem was accentuated by the fact that the prior art strut utilized two readily separable parts, and sometimes required preassembly depending on stud spacing.

It would therefore be desirable to have a strut having the alignment and box securing advantages of the noted prior art strut, but which did not have to be assembled from readily separable parts, and which could quickly be field formed to accommodate the box depth, while at the same time could be readily mounted to any interior or exterior surface of a metal stud, or the exterior of a wood stud.

SUMMARY OF THE INVENTION

An electrical box support assembly for stud wall construction includes two channel shape struts with one being confined by and telescoping in the other. Both have a longitudinally extending V-shape groove opening toward the box or boxes to be supported thereon whereby the boxes may quickly be attached by a self tapping screw with a screw gun. The groove ensures that each box is straight and, if more than one box is mounted, both straight and aligned. While the two parts may be telescoped they are not readily separable and are sufficiently rigid so that they do not need to be preassembled. The opposite ends of the struts are each provided with planar tabs with two longitudinally spaced designed bend points at which the strut ends or tabs may selectively be field bent to form right angle flanges matching the depth of the box to be supported. The tab ends of the struts are shipped straight and flat and in some forms may include one or more additional bend points which, when the strut end tab is selectively bent, may be used to form a flange substantially parallel to the strut. The parallel flange may be the full width or one-half the width of the stud. The field formed flanges may be provided with holes to facilitate the screw gun fastening of the strut ends to substantially any surface of the stud. If a projecting portion of the tab is not employed, it may simply be folded back on itself to form a double thickness end.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a perspective view of a box support in accordance with the present intention;

FIG. 2 is an enlarged transverse section of the support taken from the line 2—2 of FIG. 1;

FIG. 3 is a similar section looking in the opposite direction from the line 3—3 of FIG. 2;

FIG. 4 is a view similar to FIG. 1 showing the ends of the support field bent at one of the bend points to form stud mounting flanges of greater depth;

FIG. 5 is a similar view showing the support ends bent at one of the other bend points to form mounting flanges of lesser depth;

FIG. 6 is an enlarged broken plan view of an end of the support showing the end of the mounting flange folded back on itself;

FIG. 7 is a broken perspective view showing two different supports field formed for different box depths and secured to studs;

DETAILED DESCRIPTION OF THE PREFERRED EMBODIMENTS

Figure 8:
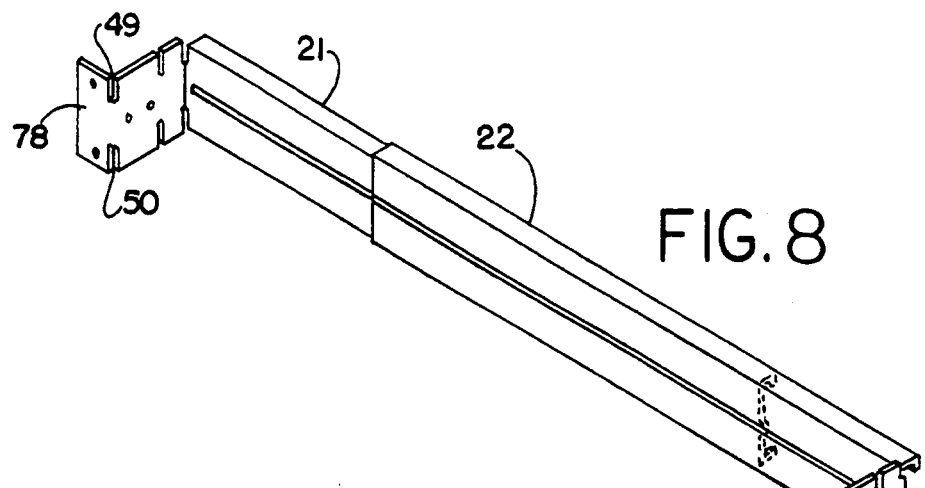
FIG. 8 is a view similar to FIG. 4 but showing the ends formed to provide parallel mounting flanges.

Referring first to FIGS. 1-3 there is illustrated a box support 20 in accordance with the present invention which comprises telescoping struts 21 and 22. The strut 21 telescopes within the somewhat larger strut 22. The struts both include faces 23 and 24 which include horizontally aligned outwardly opening V-grooves 25 and 26, respectively. Such grooves are designed to receive in the crotch 27 thereof the tips of sheet metal screws so that electrical boxes and the like may quickly be secured or attached to the face of the support by self tapping screws with a screw gun. The grooves ensure that each box is straight and if more than one box is mounted on the support, both straight and aligned. The struts telescope one within the other so that the support may be adjusted in length horizontally to fit between wall studs which may vary in spacing. For example, in some wall constructions studs may be placed on 16" centers or on 24" centers.

The strut 22 includes edge legs 30 and 31 which extend rearwardly from the face, which legs terminate in inturned flanges 32 and 33, respectively. Similarly, the strut 21 includes edge legs 35 and 36 which also terminate in inturned flanges 37 and 38, respectively. The legs 30 and 31 of the somewhat larger strut as well as the flanges 32 and 33 embrace and capture the legs 35 and 36 as well as a portion of the flanges 37' and 38. This construction illustrated more clearly in FIGS. 2 and 3 provides substantial surface contact between the two struts so that while they may readily be telescoped one within the other, they won't readily come apart. The nested grooves as well as the nested leg and inturned flanges also substantially rigidify the struts both individually and even further when telescoped.

The outer ends of each strut are provided with planar tabs as indicated at 40 and 41, respectively, while the opposite or inner ends are simply cut off as indicated at 42 and 43, respectively. The face of each tab is coplanar with the face of the respective strut and as seen more clearly in FIGS. 2 and 3 the tabs are somewhat wider than the face of the strut extending beyond the edge legs.

Each tab includes two pairs of transversely aligned box depth accommodating bend point forming edge slot notches, one pair being seen at 45 and 46 while the other pair is seen at 47 and 48. The latter or inner pair is adjacent to the commencement of the edge legs and the central V-groove. The paired notches 45 and 46 are spaced from paired notches 49 and 50 a distance equal to a standard box depth of, for example, 1½ inches. The aligned notches 47 and 48 are spaced from the notches 49 and 50 a distance equal to another standard box depth which is, for example, 2⅛ inches. The aligned notches thus create bend points which permit the tabs to be bent at either location to form a right angle mounting flange which generally corresponds to the depth of the box to be mounted. The notches 49 and 50 are spaced from the ends 51 and 52 of the tabs a distance substantially equal to the edge face of a stud.

Referring now to FIGS. 4 and 5 there is illustrated a box support 20 with the tabs on the ends of the struts bent at the two different bend points to form right angle mounting flanges which are of a different length. The box support in FIG. 4 has the tabs bent at the notches 47 and 48 to form right angle mounting flanges which may be of the 2⅛ inch dimension to support a box of larger depth.

In FIG. 5 the tabs are bent at the notches 45 and 46 to form shorter mounting flanges to support a box of the shallower depth. Once the box is secured to the support by suitable sheet metal fasteners 58 (see FIG. 7) which extend through the crotch of the V-grooves not only is the box secured to the support, but the two struts are firmly secured together.

It is noted that each tab may be provided with a series of horizontally aligned and spaced holes seen at 60 and 61 which facilitate the securing of the formed flanges to wall studs. The tab beyond the outer notches 49 and 50 may be provided with two vertically spaced holes 62 and 63 for the same purpose.

Referring now to FIG. 6 it will be seen that the portion of the tab 40 or 41 beyond the notches 49 and 50 may be folded back flat upon itself so that the tab beyond the end is a double thickness. Then bending the tabs at either paired edge notches 45, 46 or 47, 48 will form a simple right angle flange as seen in FIG. 7.

In FIG. 7 there is illustrated two spaced metal studs 66 and 67 which are identical. Each has a major vertical wall 68 and two right angle legs 69 and 70 which terminate in respective inturned flanges 71 and 72. It is the right angle legs which form the edge faces of the stud to which wall board, for example, is secured.

In FIG. 7 there is illustrated two box supports 74 and 75 secured by sheet metal screws to the interior of stud 66 and the exterior of stud 67. In both supports the portion of the tab beyond the notches 49 and 50 has been bent back upon itself as in FIG. 6. In the top support 74 the tabs have also been bent at the notches 47 and 48 to form a right angle mounting flange accommodating boxes of greater depth. In the lower support the tabs have been bent at the notches 45 and 46 to accommodate boxes 76 of lesser depth. In this manner the supports may be secured to the interior or exterior of the major wall of the studs.

Referring now to FIG. 8 it will be seen that the tabs beyond the notches 49 and 50 may be bent to form flanges 78 and 79 which extend parallel to the major extent of the strut. Again the tabs may also be bent selectively at the paired notches 45, 46 or 47, 48 to accommodate different depth boxes. The parallel flanges 78 and 79 then enable the support to be mounted to the edge face 69 of the stud as seen at the top of FIG. 11, utilizing the holes 62 and 63.

Figure 10:
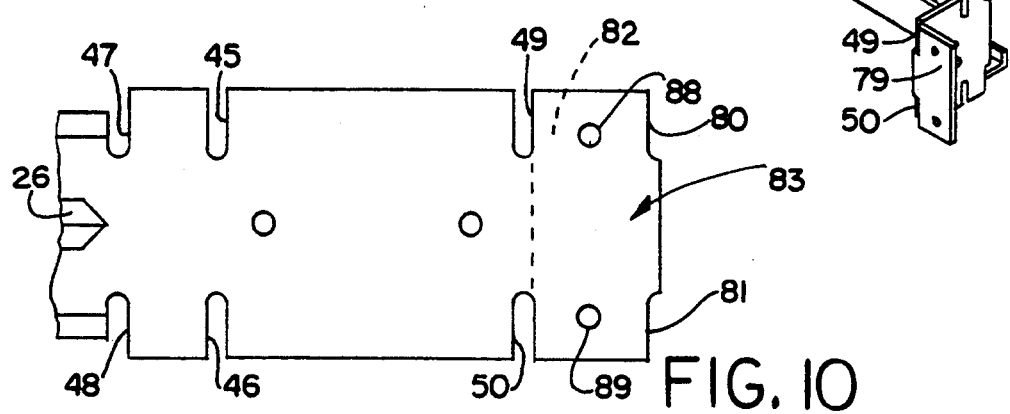
FIG. 10 is a view similar to FIG. 9 but showing the end folded back upon itself to form a half flange.
Figure 9:
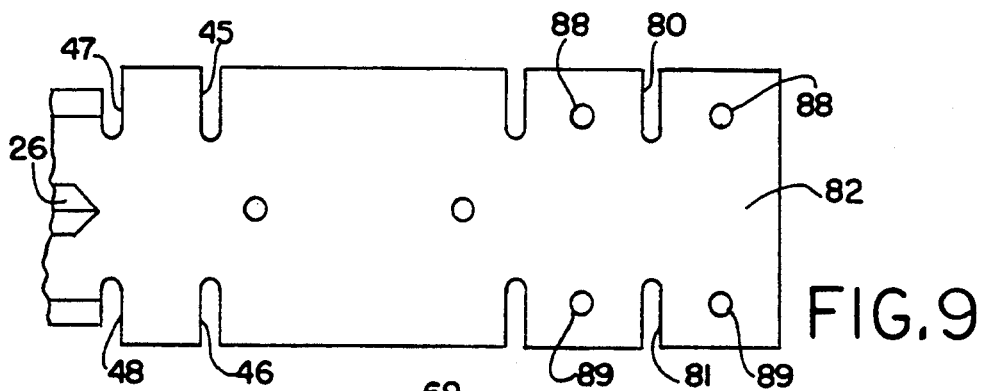
FIG. 9 is an enlarged broken plan view of an end of a somewhat different form.
Figure 11:
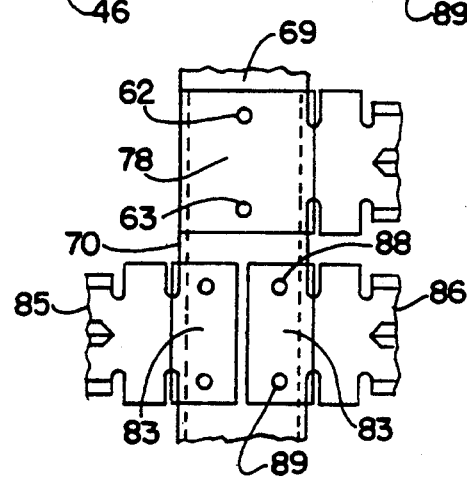
FIG. 11 is a fragmentary elevation of a stud with three supports secured to the face thereof, the one at the top using a full parallel flange while those at the bottom use a half flange.

Referring now to FIGS. 9, 10 and 11 there is illustrated an embodiment wherein each tab 40 and 41 beyond the notches 49 and 50 is provided with further notches 80 and 81 transversely aligned and dividing the ends of the tabs lengthwise beyond the notches 45 and 50 in half. This enables the tab portion 82 beyond the notches 80 and 81 to be folded back upon itself at such notches to form a double thickness half tab as seen in FIG. 10 at 83. In this manner when a half tab is formed two box supports seen at 85 and 86 may be mounted to the edge face of the stud at the same elevation. The half tabs may be provided with holes as seen at 88 and 89 to facilitate such mounting.

It will be appreciated that rather than creating bend points by aligned edge notches, other forms of bend points may be employed such as providing a single center slot which of course does not extend to the edges of the tabs. The supports may also be mounted similarly on any surface of a wooden stud.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. An electrical box support for stud wall construction comprising telescoping overlapping struts forming an adjustable width horizontal strut assembly, each strut having a face to which the electrical box may be secured, bendable tabs on the end of each strut in the same plane as the face adapted to be shipped flat and field bent to enable the ends of each strut to be secured to studs, and means located on the tabs to facilitate the field bending of each tab at at least two different locations whereby a flange formed by the bendable tab may vary to support electrical boxes of different depth substantially flush with the edges of the studs.

2. A box support as set forth in claim 1 wherein said means to facilitate bending comprises a transverse slot to create a bend point.

3. A box support as set forth in claim 2 wherein said means to facilitate bending comprises notches at the edge of each strut to create such bend points.

4. A box support as set forth in claim 3 including paired notches spaced from each other the difference between the selective box depths to be supported.

5. A box support as set forth in claim 4 including further paired notches on the end of each tab to form a right angle flange which extends generally parallel to the strut when the tab is bent.

6. A box support as set forth in claim 5 including yet further paired notches at the end of each tab whereby an end section of each tab may be folded back upon an adjacent section to form a half width right angle flange.

7. A box support as set forth in claim 1 wherein each strut includes a V groove extending the length thereof between said tabs and the end of the strut in the face thereof.

8. A box support as set forth in claim 7 wherein each strut includes legs at the edges terminating in inwardly directed flanges.

9. A box support as set forth in claim 8 wherein said means to facilitate bending comprises notches at the edge of each strut to create a bend point.

10. A box support as set forth in claim 9 including paired notches spaced from each other the difference between the selective box depths to be supported.

11. A box support as set forth in claim 1 wherein said means to facilitate bending comprises a transverse weakness formed in each tab to create a bend point.

12. An electrical box support in stud wall construction comprising a horizontal strut formed of telescoping members having a V groove along the center of the face thereof, to which a box is secured, and field bendable tabs at each end of said strut and in the same plane as the face of the strut adapted to be shipped flat and field bent to enable the ends of the strut to be secured to studs, and means located on the tabs to facilitate the bending of said tabs at two different locations whereby the length of the field bent tab may vary to form a flange to support boxes of different depth substantially flush with the edges of said studs.

13. A box support as set forth in claim 12 wherein said means to facilitate bending comprises transverse slots in each tab to create bend points.

14. A box support as set forth in claim 13 wherein said means to facilitate bending comprises transversely aligned notches at each edge of each tab to create such bend point.

15. A box support as set forth in claim 14 including two transversely aligned paired edge notches on each tab, each pair being longitudinally spaced the difference between the selective box depletes to be supported.

16. A box support as set forth in claim 15 including a third pair of transversely aligned edge notches adapted to form a right angle flange on the end of each tab which extends generally parallel to the strut when the tab is bent.

17. A box support as set forth in claim 16 including a fourth pair of transversely aligned edge notches whereby the end of said right angle flange may be bent back upon the adjacent section to form a half width double thickness right angle flange.

18. A box support as set forth in claim 17 wherein said tabs are planar and said V groove of each member extends from said tab to the opposite end of said member.

19. A box support as set forth in claim 18 wherein each member includes legs at the edges thereof extending from the tab to the opposite end.

20. A box support as set forth in claim 19 wherein each leg includes an inwardly directed edge flange both stiffening said members and increasing the surface contact between said members as they telescope to resist preassembly separation.

21. A support for an electrical box, comprising a bar adapted to be mounted between two spaced-apart wall studs or the like, said bar comprising an elongate web of sheet metal forming a front face of the bar and having side edges extending lengthwise of the bar, a forwardly-opening fastener receiving channel formed in the web running substantially the full length of the web between the side edges of the web, and elongate extensions of the bar projecting generally forwardly from said web at opposite ends of the bar and having free outer end portions bent to form fastening flaps extending laterally outwardly away from one another and generally parallel to the web of the bar, said flaps being adapted for engagement with said studs and securement thereto by fasteners, each extension having means spaced inwardly from said free outer end portion defining a first fold line extending generally transversely of the extension and means spaced inwardly from said first fold line defining a second fold line extending generally transversely of the extension whereby, if a relatively deep electrical box is to be attached to the bar, the extensions are adapted to be bent at said first fold lines to form said fastening flaps, and if a shallower electrical box is to be attached to the bar the extensions are adapted to be bent at said second fold lines to form said fastening flaps, said electrical box being adapted to be attached to the bar in a selected position lengthwise of the bar by placing the back wall of the box flush against the front face of the web over the channel and then fastening the box to the bar by using fasteners threaded into said channel.

22. A support as set forth in claim 21 wherein said means defining said first fold line comprises slot means in said extension along said first fold line, and said means defining said second fold line comprises slot means along said second fold line.

23. A support for an electrical box, comprising a bar adapted to be mounted between two spaced-apart wall studs or the like, said bar comprising an elongate web of sheet metal forming a front face of the bar and having side edges extending lengthwise of the bar, a forwardly-opening generally V shaped channel formed in the web running substantially the full length of the web between the side edges of the web, and elongate extensions of the bar projecting generally forwardly from said web at opposite ends of the bar and having free outer end portions bent to form fastening flaps extending laterally outwardly away from one another and generally parallel to the web of the bar, said flaps being adapted for engagement with said studs and securement thereto by fasteners, each extension having means spaced inwardly from said free outer end portion defining a first fold line extending generally transversely of the extension and means spaced inwardly from said first fold line defining a second fold line extending generally transversely of the extension whereby, if a relatively deep electrical box is to be attached to the bar, the extensions are adapted to be bent at said first fold line to form said fastening flaps, and if a shallower electrical box is to be attached to the bar, the extensions are adapted to be bent at said second fold line to form said fastening flaps, said electrical box being adapted to be attached to the bar in a selected position lengthwise of the bar by placing the back wall of the box flush against the front face of the web over the channel and then fastening the box to the bar by using fasteners threaded into said channel.

24. A support as set forth in claim 23 wherein said means defining said first fold line comprises slot means in said extension along said first fold line, and said means defining said second fold line comprises slot means along said second fold line.

25. An electrical box support for stud wall construction comprising a bar adapted to be mounted between two spaced-apart wall studs or the like, said bar having a face to which the electrical box may be secured, a bendable tab on the end of the bar adapted to be field bent to enable the end of the bar to be secured to studs, and means located on the tab to facilitate the field bending of the tab at at least two different locations whereby a flange formed by the bendable tab may vary to support electrical boxes of different depth substantially flush with the edges of the studs.

26. A box support as set forth in claim 25 wherein said means located on the tab to facilitate the field bending comprises a transverse weakness formed in the tab.

* * * * *